(12) United States Patent
Gerdes et al.

(10) Patent No.: US 8,942,835 B2
(45) Date of Patent: Jan. 27, 2015

(54) SYSTEM AND METHOD OF OPERATING HOUSEHOLD APPLIANCES

(75) Inventors: Michael Gerdes, Trent Woods, NC (US); Bruce Simmons, Kinston, NC (US); Paul Wintrode, Greenville, NC (US)

(73) Assignee: BSH Home Appliances Corporation, Irvine, CA (US)

( * ) Notice: Subject to any disclaimer, the term of this patent is extended or adjusted under 35 U.S.C. 154(b) by 895 days.

(21) Appl. No.: 13/161,553

(22) Filed: Jun. 16, 2011

(65) Prior Publication Data

US 2012/0323392 A1    Dec. 20, 2012

(51) Int. Cl.
*G06F 19/00* (2011.01)
*H04L 12/28* (2006.01)
*H02J 3/14* (2006.01)
*H02J 13/00* (2006.01)
*D06F 33/02* (2006.01)

(52) U.S. Cl.
CPC ........ *H04L 12/2827* (2013.01); *H04L 12/2818* (2013.01); *H02J 3/14* (2013.01); *H02J 13/0075* (2013.01); *H04L 2012/285* (2013.01); *Y04S 20/222* (2013.01); *Y04S 20/228* (2013.01); *H04L 2012/2841* (2013.01); *D06F 33/02* (2013.01); *H02J 2003/143* (2013.01); *Y02B 70/3225* (2013.01); *Y02B 70/325* (2013.01); *Y02B 70/3266* (2013.01); *Y02B 90/2653* (2013.01); *Y04S 20/242* (2013.01); *Y04S 40/126* (2013.01)
USPC ........... 700/90; 700/286; 700/83; 365/185.18

(58) Field of Classification Search
USPC .......................... 700/90, 21, 17, 83, 286, 296; 365/185.18, 185.19, 185.21; 709/201, 709/203, 208, 220
See application file for complete search history.

(56) References Cited

U.S. PATENT DOCUMENTS

| | | | |
|---|---|---|---|
| 5,875,430 A | 2/1999 | Koether | |
| 5,927,598 A | 7/1999 | Broe | |
| 7,206,670 B2 * | 4/2007 | Pimputkar et al. | 700/291 |

(Continued)

FOREIGN PATENT DOCUMENTS

| | | |
|---|---|---|
| EP | 0620631 A1 | 10/1994 |
| EP | 0727668 A1 | 8/1996 |

(Continued)

OTHER PUBLICATIONS

International Search Report PCT/EP2012/061219.

(Continued)

*Primary Examiner* — Kidest Bahta
(74) *Attorney, Agent, or Firm* — James E. Howard; Andre Pallapies

(57) ABSTRACT

A household appliance configured to communicate with a second household appliance, a network of household appliances that can communication with each other, and method of controlling an operation of a primary function unit of a first household appliance based on one of a priority scheme and synchronized duty cycles of the first household appliance and the second household appliance, wherein the first household appliance is configured to communicate with the second household appliance. The household appliance includes a primary function unit, a controller that controls an operation of the primary function unit, a two-way communication module that transmits and receives signals between the controller and the second household appliance.

29 Claims, 8 Drawing Sheets

(56) References Cited

U.S. PATENT DOCUMENTS

| | | | |
|---|---|---|---|
| 7,336,192 B2 | 2/2008 | Aisa | |
| 7,423,546 B1 * | 9/2008 | Aisa | 340/679 |
| 8,054,769 B2 * | 11/2011 | Suen et al. | 370/310 |
| 8,644,166 B2 * | 2/2014 | Xia et al. | 370/241 |
| 8,730,018 B2 * | 5/2014 | Besore et al. | 340/13.25 |
| 2001/0039460 A1 * | 11/2001 | Aisa | 700/17 |
| 2004/0153170 A1 | 8/2004 | Santacatterina et al. | |
| 2006/0117491 A1 | 6/2006 | Kim | |
| 2006/0200255 A1 | 9/2006 | Cenedese et al. | |
| 2008/0137572 A1 * | 6/2008 | Park et al. | 370/310 |
| 2008/0143489 A1 * | 6/2008 | Castaldo et al. | 340/286.01 |
| 2008/0218148 A1 | 9/2008 | Robertson | |
| 2010/0060079 A1 | 3/2010 | MacLellan et al. | |
| 2010/0089909 A1 | 4/2010 | Besore et al. | |
| 2010/0179708 A1 | 7/2010 | Watson et al. | |
| 2011/0070340 A1 | 3/2011 | Pechaigner et al. | |
| 2013/0317662 A1 | 11/2013 | Ahn et al. | |

FOREIGN PATENT DOCUMENTS

| | | |
|---|---|---|
| WO | 2008071995 A2 | 6/2008 |
| WO | 2009032058 A2 | 3/2009 |

OTHER PUBLICATIONS

Jukka V. Paatero et al., A model for generating household electricity load profiles, publication date Jul. 18, 2005.
Energy Sentry, Demand Controllers, publication date 1998.

* cited by examiner

SYSTEM AND METHOD OF OPERATING HOUSEHOLD APPLIANCES

FIELD OF THE INVENTION

The present invention is directed to a system and method of shared duty cycles and operating a household appliance priority scheme, and more particularly, to a household appliance having an internal communications module, or a plurality of household appliances having internal communications modules forming a network of appliances, and a method of shared duty cycles and operating a priority scheme of one or more of the household appliances.

BACKGROUND OF THE INVENTION

The operation of household appliances accounts for a large percentage of residential energy usage per household. Conventionally, an external device or hub (i.e., communication hub or controller) has been used to control the operation of one or more household appliances or monitor energy (e.g., power) usage of one or more household appliances. In operation, the conventional hub commonly may be plugged into a power source, and then a power cord of each of the appliances, which is intended to be controlled/monitored by the hub, is plugged into the hub. Conventional devices attempt to control, for example, operating times of one or more household appliances, to reduce energy usage of one or more household appliances, or to prevent the household from exceeding a maximum energy (e.g., power) consumption.

SUMMARY OF THE INVENTION

The problems with the conventional external communication devices and hubs and others are addressed by the present invention, a first exemplary embodiment of which comprises a household appliance configured to communicate with a second household appliance, the household appliance comprising a housing, wherein the housing includes a primary function unit that performs a primary function of the household appliance, a controller that controls an operation of the primary function unit, a two-way communication module within the housing for transmitting and receiving signals between the controller and the second household appliance.

Another exemplary embodiment of the invention comprises a network of household appliances configured to communicate with each other, the network comprising a first household appliance, and a second household appliance, wherein the first household appliance has a housing including a primary function unit that performs a primary function of the household appliance, a controller that controls an operation of the primary function unit, and a two-way communication module within the housing for transmitting and receiving signals between the controller and the second household appliance.

A further exemplary embodiment of the invention comprises a method of controlling an operation of a primary function unit that performs a primary function of a first household appliance based on one of a priority scheme of the first household appliance and a second household appliance and synchronized duty cycles of the first household appliance and the second household appliance, wherein the first household appliance is configured to communicate with the second household appliance, the method comprising one of transmitting and receiving signals between a controller of the first household appliance and a second household appliance using a two-way communication module of the first household appliance, controlling an operation of the primary function unit of the first household appliance based on a priority scheme of the first household appliance and the second household appliance and synchronized duty cycles of the first household appliance and the second household appliance.

In this manner, the exemplary embodiments can automatically create a mesh network of household appliances (e.g., white goods) that does not require an external controller device. Instead, in the exemplary embodiments, each household appliance may include either a network controller or a network node.

The exemplary embodiments can use a priority scheme to determine which household appliances in the mesh network, and more particularly, which primary function units of the household appliances in the mesh network, can consume energy depending on user interaction. The exemplary embodiments recognize that domestic household appliances, such as a dishwasher, washing machine, dryer, refrigerator, range, oven, cook top, water heater, or the like can be configured to cooperate or interact such that one appliance will not turn on if another appliance is performing an operating cycle that consumes a larger amount of energy (i.e., a high-energy portion of an operating cycle). The embodiments can use a priority scheme (e.g., a factory-set priority scheme or a user-configurable priority scheme) to determine which household appliances can consume energy (e.g., power) depending on a user interaction.

The exemplary embodiments also can use integrated or shared duty cycles among the appliances in the network based on a user interaction. The network of household appliances having integral controllers and communication modules can operate such that the appliances 'share' or 'synchronize' duty cycles. For example, the embodiments recognize that an oven commonly is off (i.e., the oven is not drawing any power) for 51% of a typical bake cycle. The embodiments can take advantage of this 'off time' and use it to allow other household appliances to operate when the oven is being used, but not drawing power. Other household appliances in the network may either have similar 'off times' in their duty cycles, or the operating duty cycles of these appliances can be modified or adjusted to include 'off-time' built into their operating duty cycles, thereby reducing the household's peak energy (e.g., power) consumption.

In this manner, the exemplary embodiments can reduce the peak energy consumption of one or more household appliance in the household and can ultimately save the homeowner money while reducing the peak demand for energy (e.g., from the power grid).

Furthermore, the exemplary embodiments can provide a "whole-household" approach that is particularly suited and advantageous for use in domestic household appliances since manufacturers of domestic household appliances commonly produce many types of domestic household appliances. Accordingly, a manufacturer can simply and easily provide a plurality of household appliances that can be automatically configured into a mesh network of different household appliances for use in a household. In this manner, a mesh network of household appliances can automatically be created to cooperate at a cost savings to the customer, for example, who is not connected to the smart-grid, but is enrolled in a utilities' time-of-use program. The present invention can reduce the peak energy consumption of the household and can ultimately save the homeowner money while reducing the peak demand for energy (e.g., from the power grid).

The present invention recognizes that usage of various types of energy (e.g., electricity, water, fuel, etc.) by a domestic household may be monitored or metered (e.g., by a utility company, public works company, municipality, or other local, county, state, or federal government department or agency) to determine an overall amount of energy usage by a particular user, household, or group, to determine an amount of energy usage during peak and/or non-peak time periods, and/or to determine a cost of the consumed energy to paid by the particular domestic user, household, or group. The fees associated with energy usage may be based on the overall amount of energy used, regardless of the time period of use. In other instances, the fees associated with energy usage during peak time periods may be greater than the fees associated with energy usage during non-peak periods. In other instances, the fees associated with energy usage may be tiered such that a fee (e.g., a per unit fee) for an amount of energy usage, or peak energy usage, incrementally or continuously increases as the overall amount of energy usage, or the amount of peak energy usage, exceeds one or more predetermined thresholds or levels. The exemplary embodiments can provide important advantages by reducing the peak energy (e.g., power) consumption of one or more household appliances in the household, which may reduce energy usage fees for the household or homeowner while also reducing the peak demand (e.g., for the power grid).

For purposes of this disclosure, a primary function unit of a household appliance is defined as a component, device, or system, etc. of the household appliance that performs a primary function of the household appliance and that consumes energy in performing the primary function of the household appliance.

The energy consumed can include, for example, electrical power (e.g., from the power grid), water, fuel (e.g., gas, natural gas, oil, propane, etc.), or any other type of energy that commonly is monitored or metered (e.g., by a utility company, public works company, municipality, or other local, county, state, or federal government department or agency) to determine an amount of usage by a particular user, household, or group and/or to determine a cost of the consumed energy to paid by the particular user, household, or group.

For example, a component, device, or system, etc. of the household appliance that performs the primary function of the household appliance can be powered by electricity, or operate using electricity, distributed from the power grid. In a domestic household appliance such as a dishwasher, a component, device, system, etc. that performs the primary function of the household appliance and operates using electricity may include, for example, a drain pump, a drying device or washing system, etc. In a domestic household appliance such as a washer or dryer, a component, device, system, etc. that performs the primary function of the household appliance and operates using electricity may include, for example, a motor for rotating the drum, a drain pump or water pump, a water heater, an air heater, a fan, etc. In a domestic household appliance such as a refrigerator, a component, device, system, etc. that performs the primary function of the household appliance and operates using electricity may include, for example, a condenser, fan, lights, ice maker, etc. In a domestic household appliance such as a range, oven, cook top, a component, device, system, etc. that operates using electricity may include, for example, a heating element, circulating fan, exhaust fan, etc. A component, device, system, etc. that performs the primary function of the household appliance and operates using electricity may include, for example, one or more components that operate, for example, together or separately and during the same or different use or operation cycles of the appliance. One of ordinary skill in the art will recognize that a component, device, system, etc. can include one or more components that perform, for example, an operating cycle of the household appliance that consumes a larger amount of energy (i.e., a high-energy portion of an operating cycle) compared to other functions of the appliance.

In other embodiments, a component, device, or system, etc. of the household appliance that performs the primary function of the household appliance can consume other types of energy, such as water or fuel, or operate using water or fuel, distributed or supplied to the household. For example, in a domestic household appliance such as a dishwasher, a component, device, system, etc. that operates using water may include a dishwashing system having spray nozzles, etc. for spraying washing or rinsing fluid onto dishes, cutlery, etc. In a domestic household appliance such as a washer or dryer, a component, device, system, etc. that operates using water or fuel may include, for example, a laundry wash system that wets or rinses laundry, a drying system, a gas water heater, a gas air heater, etc. In a domestic household appliance such as a refrigerator, a component, device, system, etc. that operates using water may include an ice maker, water dispenser, etc. In a domestic household appliance such as a range, oven, cook top, a component, device, system, etc. that operates using fuel may include, for example, a gas burner, simmer, broiler, fryer, etc.

The embodiments are not limited to any particular type of energy and can include any energy, for example, that commonly is monitored or metered (e.g., by a utility company, public works company, municipality, or other local, county, state, or federal government department or agency) to determine an amount of usage by a particular domestic user, household, or group and/or to determine a cost of the consumed energy to paid by the particular domestic user, household, or group.

Other features and advantages of the present invention will become apparent to those skilled in the art upon review of the following detailed description and drawings.

BRIEF DESCRIPTION OF THE DRAWINGS

These and other aspects and features of embodiments of the present invention will be better understood after a reading of the following detailed description, together with the attached drawings, wherein.

DETAILED DESCRIPTION OF THE EXEMPLARY EMBODIMENTS OF THE INVENTION

Figure 1:
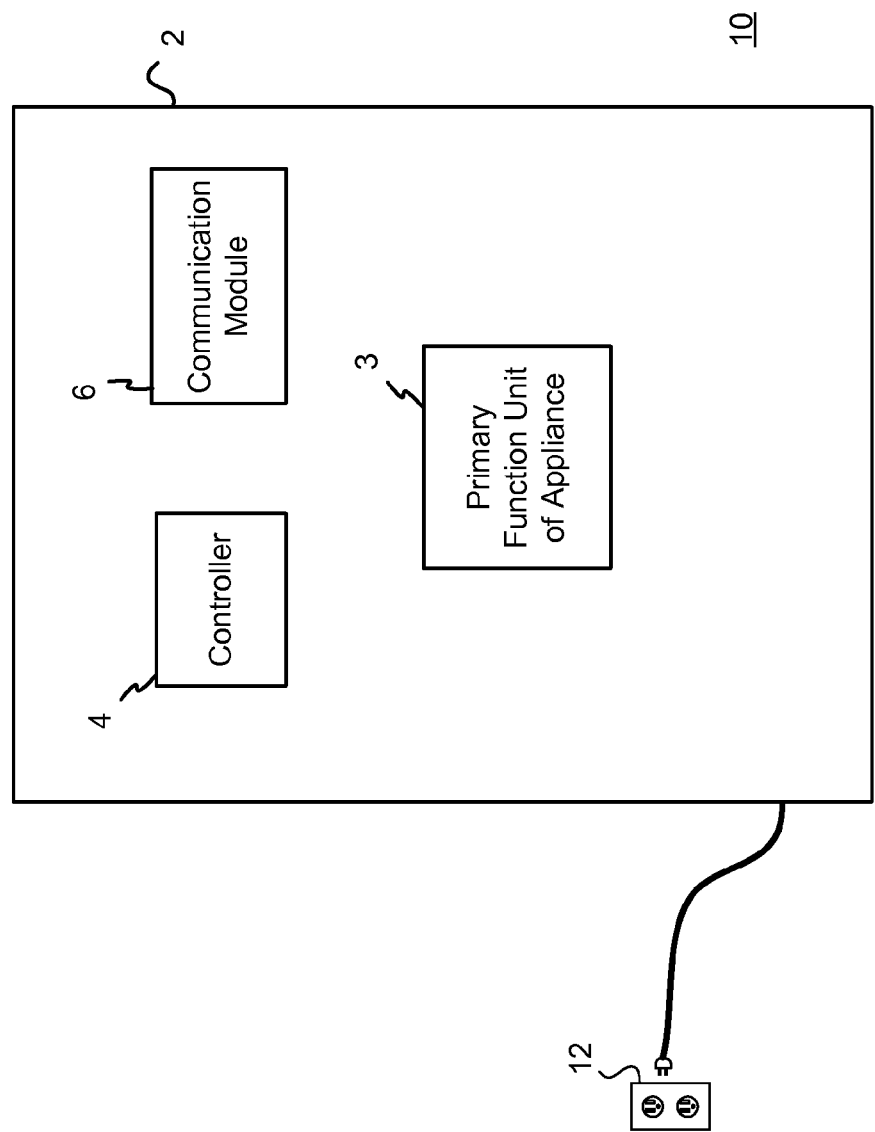
FIG. 1 is a schematic of a household appliance according to an exemplary embodiment of the invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Referring now to the drawings, FIGS. 1-8 illustrate exemplary embodiments of a household appliance and network of household appliances will now be described.

With reference to FIG. 1, an exemplary embodiment of a domestic household appliance 10 can include a housing 2 having one or more energy consuming primary function units 3 that are used to perform the intended functions of the household appliance 10. The domestic household appliance 10 can include a controller 4 for controlling the primary function unit 3 and an internal (i.e., on-board or embedded) communication module 6 for communicating with other household appliances. The household appliance 10 can be coupled (i.e., directly coupled) to a power supply (e.g., 12) via a conventional power cord. In this manner, the household appliance 100 does not require any additional setup by the homeowner and does not rely on the homeowner to change their behavior.

The controller 4 can receive and execute incoming software applications, data and/or commands from other household appliances or the Smart Grid, for example, via the communication module 6, react or respond to the received software applications, data and/or commands, and/or transmit outgoing software applications, data and/or commands to other household appliances or the Smart Grid for example, via the communication module 6. The internal communication module 6 can include, for example, a two-way communication module that receives and transmits communication signals from/to other household appliances or the Smart Grid. The controller 4 can control the operation of the energy consuming primary function unit 3 of the household appliance 10 based on the received software applications, data and/or commands regarding one or more other household appliances. The controller 4 can react or respond (e.g., automatically react or respond) to the received software applications, data and/or commands, for example, by adapting, changing, or suspending the operation of the energy consuming primary function unit 3 of the household appliance 10, shifting priorities of the energy consuming primary function unit 3 of the household appliance 10 or other household appliances, and/or by transmitting software applications, data and/or commands to other household appliances or the Smart Grid via the communication module 6.

Figure 5:
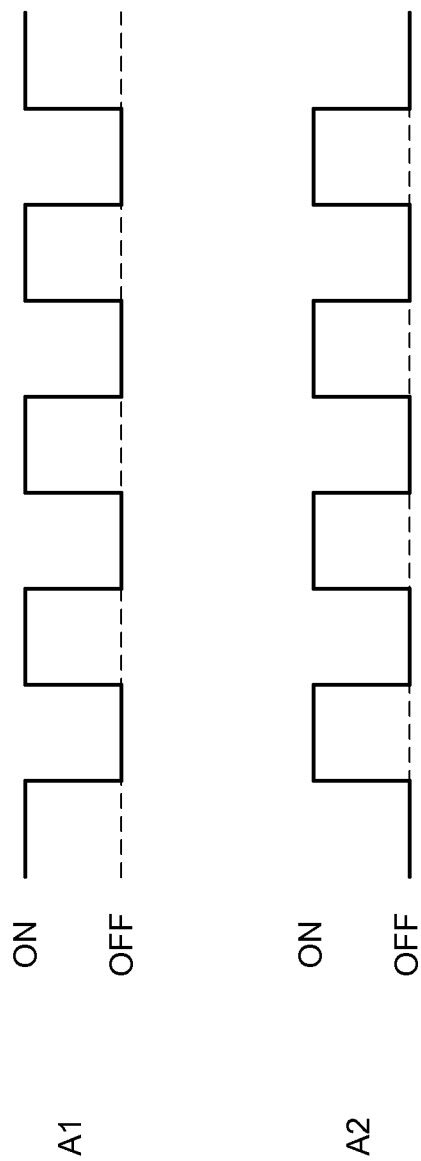
FIG. 5 is a graph showing a synchronized duty cycle of a network of household appliances according to an exemplary embodiment of the invention.
Figure 6:
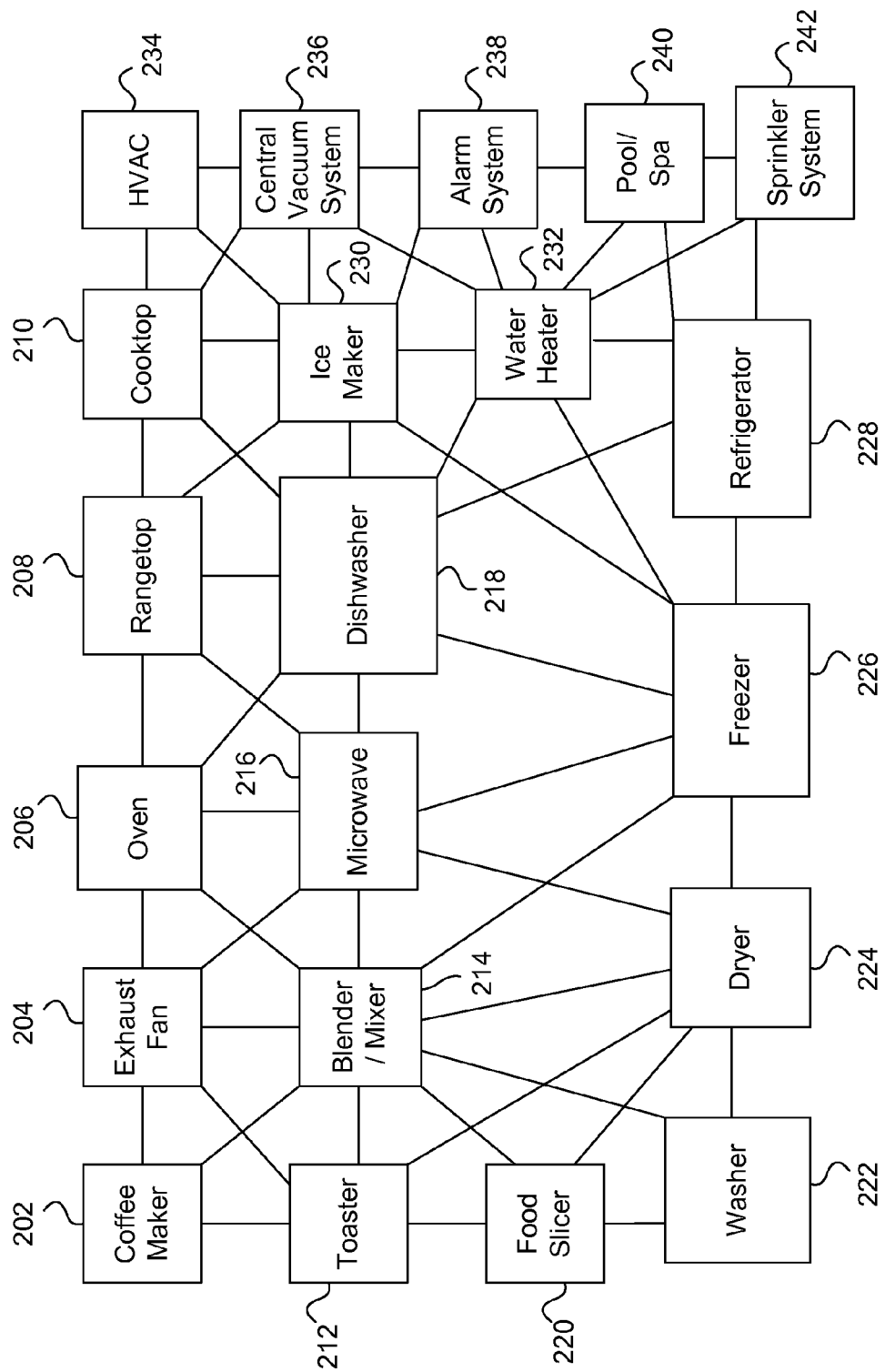
FIG. 6 is a schematic of a network of household appliances according to an exemplary embodiment of the invention.
Figure 7:
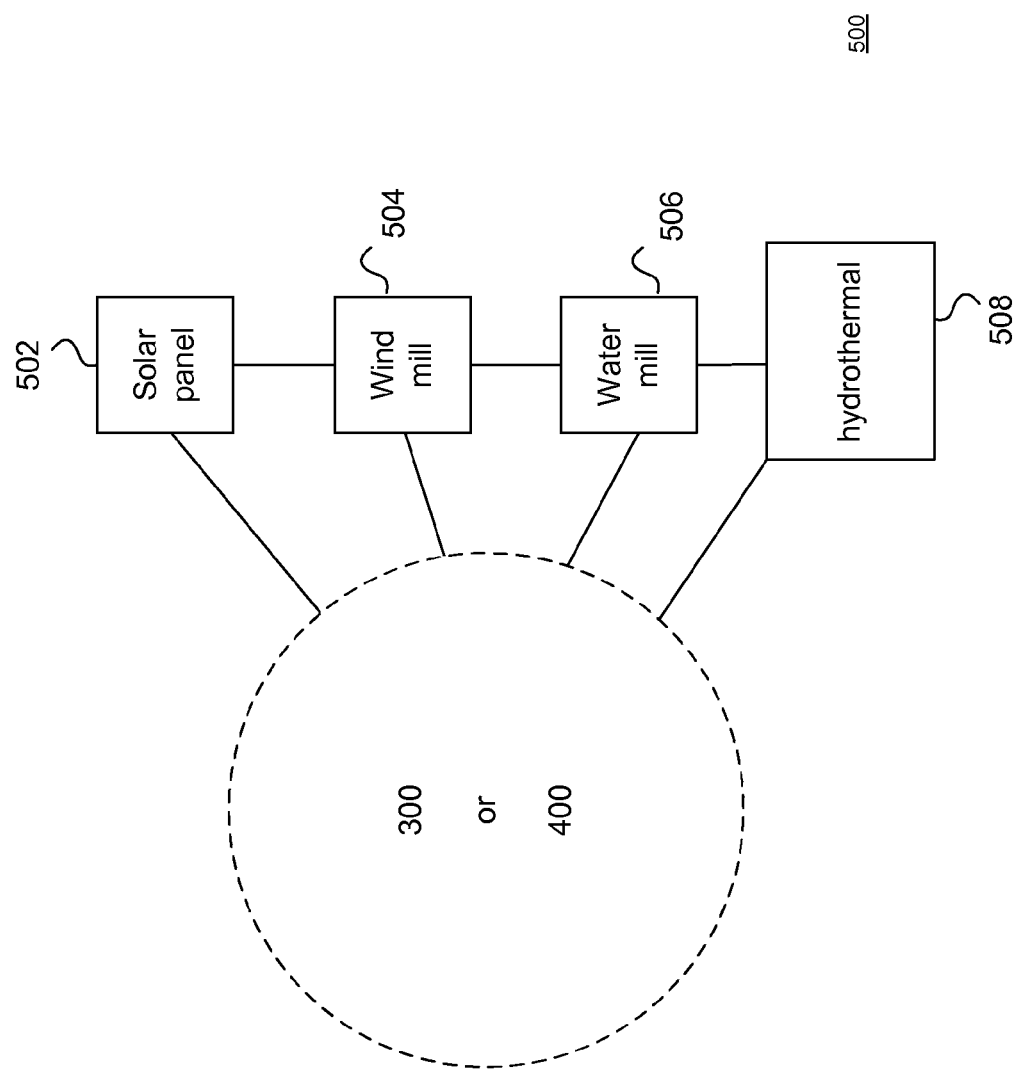
FIG. 7 is a schematic of a network of household appliances according to an exemplary embodiment of the invention.

The domestic household appliance 10 can include any domestic household appliance, for example, for performing kitchen and/or laundry functions, including but not limited to, a coffee machine or coffee maker 202, exhaust fan 204, oven 206 (e.g., gas or electric), range top 208 (e.g., gas or electric), cook top 210 (e.g., gas or electric), toaster 212, blender/mixer 214, microwave 216, dishwasher 218, food slicer 220, laundry appliance such as a washer 222, dryer 224, or other laundry device (e.g., dry cleaning device, dryer and wrinkle remover, etc.), freezer 226, refrigerator 228, freezer/refrigerator combination, ice maker 230, or other laundry or kitchen machines, such as universal or multi-function kitchen machines, water or filtered water dispensers, etc., as illustrated in FIG. 5. The household appliance 10 is not limited to domestic household kitchen and/or laundry appliances, and may include or be configured to communicate with any other domestic household appliance, for example, including but not limited to, a water heater 232 (e.g., gas, electric, oil, coal, etc.), a heating ventilation and air conditioning system (HVAC) 234 (e.g., gas, electric, oil, coal, geothermal, etc.), a central vacuum system 236, an alarm system 238 (e.g., security/burglar, smoke, fire, carbon monoxide (CO), etc.), a pool/spa 240, and/or a sprinkler system 242 (e.g., fire, lawn and garden, etc.), as illustrated in FIG. 6. The household appliance 10 also may be configured to communicate with non-energy consuming, or energy generating, domestic appliances such as, for example, a solar panel 502, wind mill 504, water mill 506, hydrothermal device 508, etc., as illustrated in FIG. 7.

One of ordinary skill in the art will recognize that the primary function unit 3 of each respective appliance for performing the intended function(s) of the appliance 10 can include electricity consuming components or systems such as one or more of control panels, motors, pumps, sensors, fans, heating or cooling elements, compressors, evaporators, lighting devices, among other things, which are not described herein in detail. In other embodiments, the primary function unit 3 of the respective appliances 10 for performing the intended function(s) of the appliance can include liquid or fuel consuming components or systems such as one or more of fluid spray systems, washing liquid or rinsing liquid supply systems, water supply systems, gas burners, gas water heaters, gas air heaters, among other things.

Figure 2:
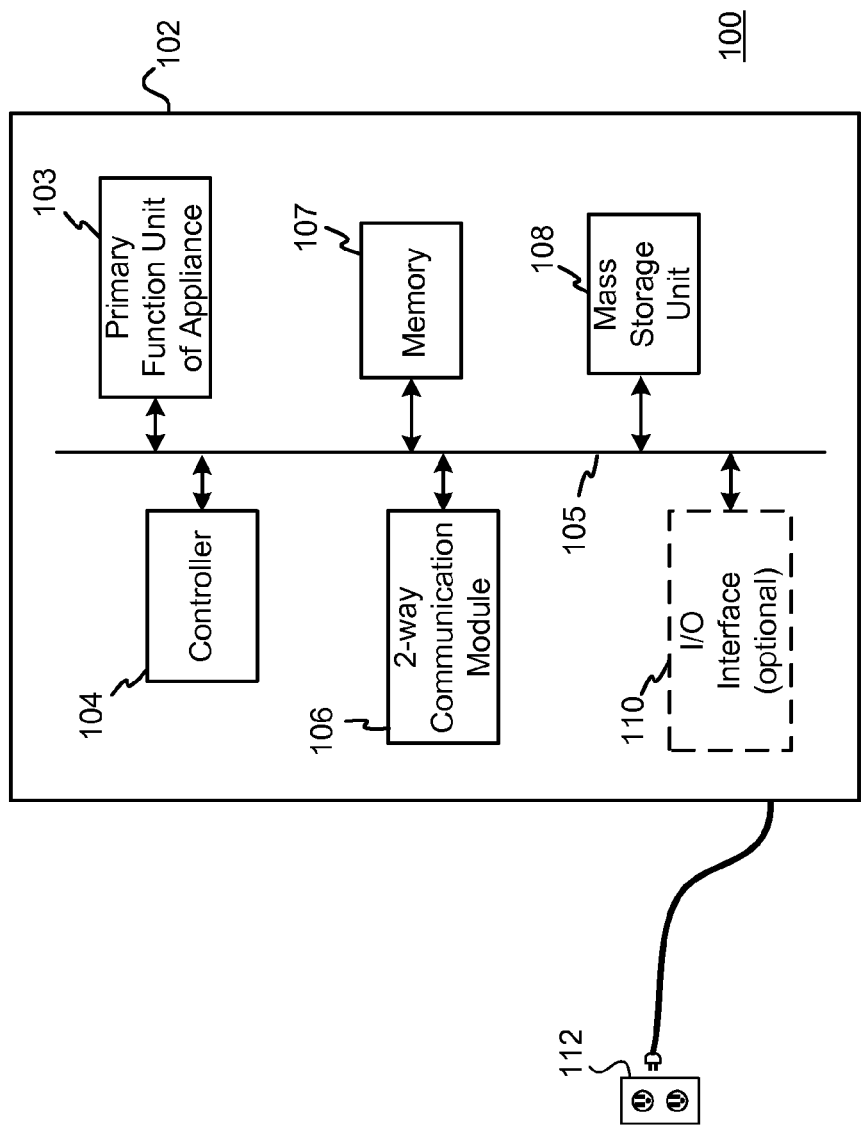
FIG. 2 is a schematic of a household appliance according to an exemplary embodiment of the invention.

Referring to FIG. 2, an exemplary embodiment of a domestic household appliance 100 can include, for example, a housing 102 having one or more energy consuming primary function units 103 that are used to perform the intended functions of the household appliance. The domestic household appliance can include a controller 104, a system bus 105, an internal (i.e., on-board or embedded) communication module 106, a memory unit 107, and a storage unit 108 arranged inside the housing 102 (i.e., factory-installed).

The household appliance 100 can be coupled (i.e., directly coupled) to a power supply (e.g., 112) via a conventional power cord. In this manner, the household appliance 100 does not require any additional setup by the homeowner and does not rely on the homeowner to change their behavior. In other embodiments, an existing household appliance can be modified or updated to include an internal (i.e., on-board or embedded) communication module 106, along with a controller 104 and a storage device 108 if needed, arranged inside the housing 102.

As shown in FIG. 2, the household appliance 100 can include a controller 104 that receives and executes software applications, data and/or commands from other household appliances or the Smart Grid via the communications module 106, reacts or responds to the received software applications, data and/or commands, and/or transmits software applications, data and/or commands to other household appliances or the Smart Grid via the communications module 106.

The software applications, data and/or commands received by, or transmitted by, via the communications module 106 of the household appliance 100 can include, for example, the 'on' and 'off' times of duty cycles, priority schemes including factory-set priority schemes, user-configurable priority schemes, and other data, metrics, information, or algorithms with respect to, for example, current and future operating cycles, current or impending actions being performed by such operating cycles, time remaining until completion of a current operating cycle or time to commencement of a future operating cycle, etc. The data and/or commands received by, or transmitted by, the household appliance 100 is not limited to these examples and can include other data, information, or metrics regarding the household appliance 100 or other household appliances, such as a state of a household appliance or user interactions with a household appliance, e.g., a homeowner opening a refrigerator or freezer door, external conditions to a household appliance such as an ambient temperature outside a refrigerator or freezer, emergency prevention metrics such as a state of an exhaust fan when a temperature of a cook top or range top exceeds a threshold temperature level, etc.

The controller 104 can control the operation of an energy consuming primary function unit 103 of the household appliance 100, such as the 'on' and 'off' times of duty cycles, based on the software applications, data and/or commands regarding one or more other household appliances. The controller 104 can react or respond (e.g., automatically react or respond) to the received software applications, data and/or commands, for example, by adapting, changing, or suspending the operation of the primary function unit 103 of the household appliance, shifting priorities of the primary function unit 103 of the household appliance 100 or other household appliances, and/or by transmitting software applications, data and/or commands to other household appliances or the Smart Grid.

For example, if the household appliance 100 is a washer 222 that is in the process of dispensing bleach, the controller 104 can react to this data and shift priority to the primary function unit 103 of the washer 222, or maintain high priority to the primary function unit 103 of the washer 222 if the washer 222 was already prioritized, until the bleach cycle is completed to reduce or prevent undesirable bleaching results or potential damage to laundry which may result from interrupting the bleaching process.

In another example, if a short time (e.g., 30 seconds) is remaining until the completion of a current operating cycle of the primary function unit 103 of a household appliance 100, then the controller 104 may shift or maintain priority on the primary function unit 103 of the household appliance 100 until the current operating cycle is completed, for example, to minimize disruption of the operating cycle or prevent restarting of the cycle.

As shown in FIG. 2, an exemplary embodiment of the controller 104 can include a processor, such as a microprocessor, that interfaces with a memory 107 and a mass storage unit 108 via a system bus 105. The memory 107 and/or the mass storage unit 108 may contain executable instructions and data for implementing and controlling various operations and functions of one or more energy consuming primary function units 103 of the household appliance 100. For example, the controller 104 may include a low power usage and low cost processor (or microprocessor) and utilize an operating system which may include, for example, varieties of the Windows, Unix and/or Linux operating systems. Other embodiments of the household appliance 100 may use a higher power usage processor (or microprocessor), such as a x86 based CPU. The household appliance 100 also may use high-level analysis software packages and/or custom software written in any programming and/or scripting languages.

Figure 3:
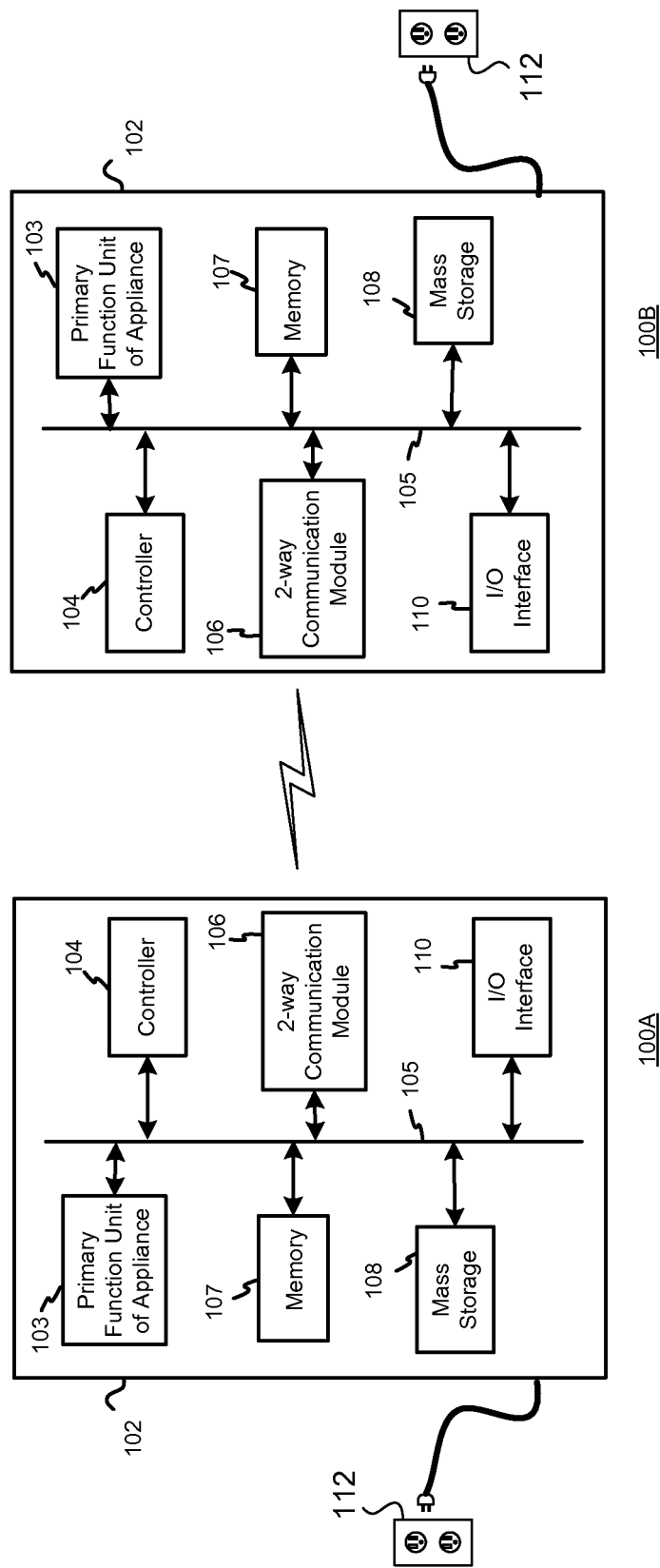
FIG. 3 is a schematic of a network of household appliances according to an exemplary embodiment of the invention.

The internal communication module 106 can include a two-way communication module that receives and transmits communication signals from/to other household appliances or the Smart Grid, as shown in FIGS. 2 and 3. The internal communication module 106 may interface with the controller 104 over the system bus 105, and can provide an interface for communication with any available external appliances, devices, or networks.

The internal communication module 106 can include a wired or wireless communication module, such as a ZigBee module or other Smart Grid communication device, a WiFi module, or another suitable off-the-shelf two-way communication module for establishing wired and/or wireless communication links with a communication module of another appliance and/or the Smart Grid.

The communication between the internal communication module 106 of the household appliance 100 and the communication module of another household appliance can occur across any frequency bands including Radio Frequency (RF), Microwave and Infra-Red (IR) bands.

In an exemplary embodiment using wired technology, the internal communication module 106 can include a plug portion for physically coupling the communication module 106 of the household appliance 100 to a communication module of another household appliance via, for example, a USB cable, a coaxial cable, fiber optic cable, twisted pair, digital subscriber line (DSL) or any other equivalent.

In an exemplary embodiment using wireless technology, the internal communication module 106 can include transmitting/receiving antenna(s), a transmitting/receiving LED, or the like. For example, utilizing a wireless communication link, the internal communication module 106 of the household appliance 100 may be wirelessly connected to the communication module of another household appliance via the use of radio, microwave, infra-red, and/or any other equivalent.

The wireless communication link between the internal communication module 106 of the household appliance 100 and the communication module of another household appliance can be based on different technologies, such as ZigBee, code division multiple access (CDMA), WCDMA, time division multiple access (TDMA), frequency division multiple access (FDMA), Orthogonal Frequency Division Multiplexing (OFDM), Bluetooth, or other protocols that may be used in a wireless communications network or a data communications network. Accordingly, the illustrations provided herein are not intended to limit the embodiments of the invention and are merely to aid in the description of aspects of embodiments of the invention.

The memory 107 can include read-only or random-access memory (RAM and ROM), EEPROM, flash cards, or any memory common to computer platforms.

The storage unit 108 can be used to store, for example, shared duty cycle operations and priority schemes, such as factory-set priority schemes and/or user-configured priority schemes and other data, metrics, and information related to the primary function unit 103 of the household appliance 100, the other household appliances in the household network, or the Smart Grid.

The household appliance 100 can include, for example, an input/output interface (I/O interface) to permit a user to interface with the household appliance 100, for example, for inputting user-configured priority schemes or other data, metrics, or information.

As shown in FIGS. 2 and 3, the household appliance 100 according to the embodiments can integrate control and communications features at the controller level of the household appliance 100, thereby eliminating any need to provide an external controller device.

Figure 4:
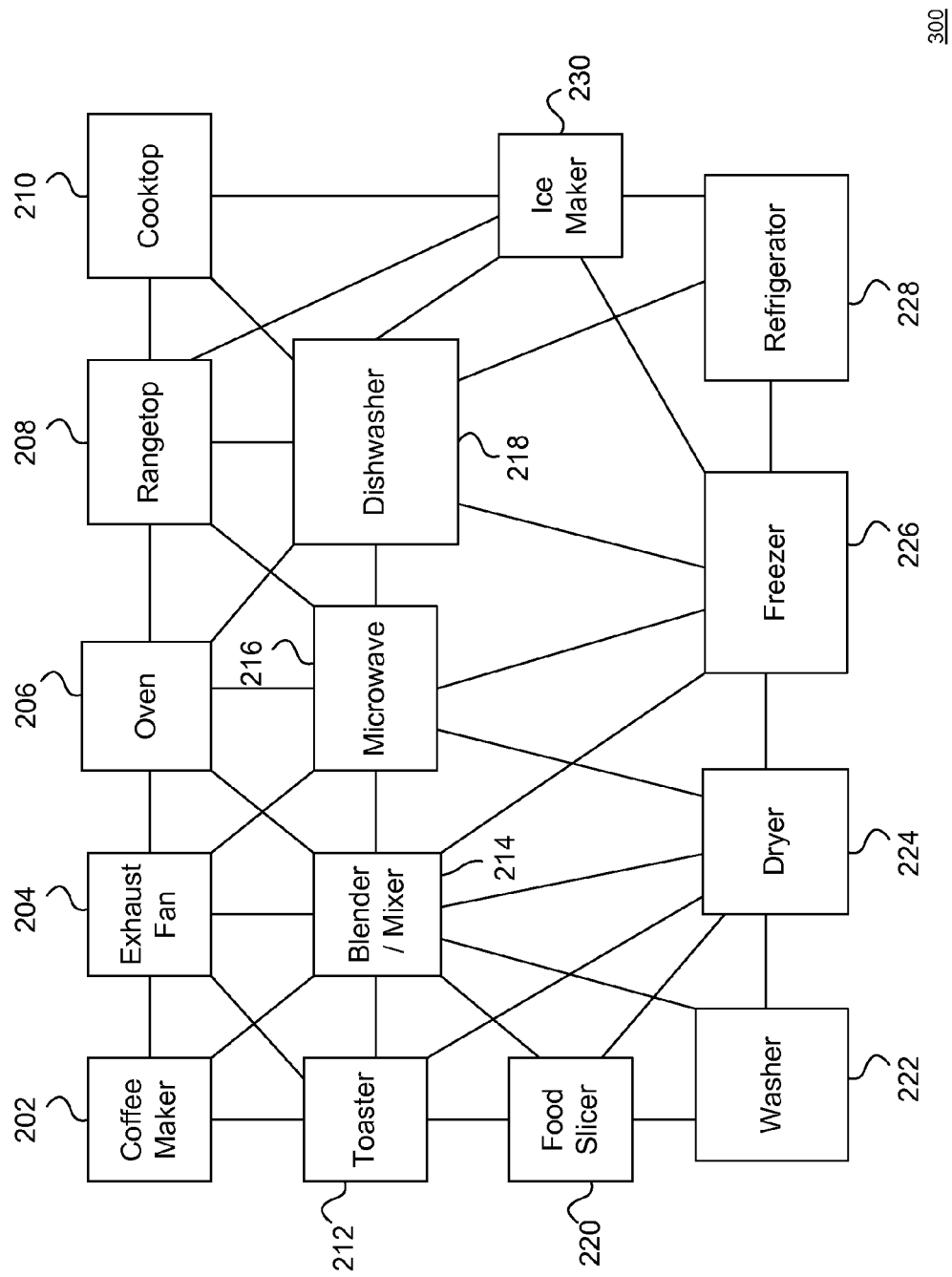
FIG. 4 is a schematic of a network of household appliances according to an exemplary embodiment of the invention.

As shown in FIG. 4, the embodiments of the household appliance 100 can facilitate the automatic creation of a mesh network 300 of kitchen and/or laundry household appliances 100 having integral control and communications features. Each appliance 100 can be either a network controller or a network node of the network 300.

In particular, the network 300 of household appliances 100 having integral controllers 104 and communication module 106 can provide inter appliance communications whereby appliances operate to "share" duty cycles. For example, as shown in FIG. 5, a first appliance A1 and a second appliance A2 can share duty cycles to reduce peak energy consumption by the first appliance A1 and the second appliance A2. The exemplary embodiments of the network 300 of household appliances 100 can use a priority scheme to determine which appliances 100 can consume energy (e.g., power) depending on user interaction, while also using integrated or shared duty cycles among the appliances 100 in the network 300, again depending on user interaction.

According to an exemplary embodiment, one or more household appliances 100 can have a factory-set priority or a user-configured priority. By way of example, a PRIORITY 1 appliance can be configured to operate (e.g., always operate) before a PRIORITY 2 appliance and so on. The shared duty cycles can be combined with an appliance priority system to provide the potential to reduce the peak energy (e.g., power) consumption of a household with minimal inconvenience to the homeowner and without relying on the homeowner to drastically change their behavior or appliance usage habits.

With reference again to FIG. 4, a network 300 of kitchen and laundry household appliances 100 can include integral controllers 104 and communication modules 106 that operate such that the primary function unit 106 of one appliance will not turn 'on' if a primary function unit of another appliance is performing an operating cycle that consumes a larger amount of energy (i.e., a high-energy portion of an operating cycle). For example, if one appliance is operating in a high-energy demand mode, another appliance will delay operating in a high-energy demand mode to reduce the overall peak energy demand of the combination of appliances within the household. This also may have an affect upon the peak demand upon the power grid.

Moreover, the network 300 of kitchen and laundry household appliances 100 having integral controllers 104 and communication modules 106 can operate such that the appliances 100 'share' or 'synchronize' duty cycles, for example, as illustrated in FIG. 5. For example, the embodiments recognize that an oven 206 commonly is off (i.e., the oven is not drawing any power) for 51% of a typical bake cycle. The embodiments can take advantage of this 'off time' and use it to allow other household appliances to operate when the oven is being used, but not drawing power. Other household appliances in the network may either have similar 'off times' in their duty cycles, or the operating duty cycles of these appliances can be modified or adjusted to include 'off-time' built into their operating duty cycles, thereby reducing the household's peak energy (e.g., power) consumption.

In this manner, the embodiments can reduce the peak energy (e.g., power) consumption of the household, and particularly the peak energy consumption by the kitchen and laundry appliance network 300, and can ultimately save the homeowner money while reducing the peak demand for the power grid. The exemplary embodiments provide a 'whole kitchen and laundry household' approach that is particularly suited and advantageous for use in domestic household appliances since manufacturers of household appliances, particularly of kitchen and laundry household appliances, commonly produce many types of household appliances. Accordingly, a manufacturer can simply and easily provide a system or network of different household appliances for use in a household in which the network of appliances can operate at a cost savings to the customer, for example, who is not connected to the smart-grid, but is enrolled in a utilities' time-of-use program.

The exemplary embodiments are not limited to kitchen and laundry appliance networks 300 and can provide a 'whole-household' approach that is particularly suited and advantageous for use in domestic household appliances since manufacturers of household appliances commonly produce many other types of household appliances. Accordingly, a manufacturer can simply and easily provide a system or network of different household appliances for use in a 'whole-household' approach in which a network 400 of domestic household appliances can operate at a cost savings to the customer, for example, who is not connected to the smart-grid, but is enrolled in a utilities' time-of-use program.

For example, referring again to FIG. 6, the household appliance 100 may be configured to communicate with any other domestic household appliance (e.g., non-kitchen and non-laundry appliances), for example, including but not limited to, a water heater 232 (e.g., gas, electric, oil, coal, etc.), a heating ventilation and air conditioning system (HVAC) 234 (e.g., gas, electric, oil, coal, geothermal, etc.), a central vacuum system 236, an alarm system 238 (e.g., security/burglar, smoke, fire, carbon monoxide (CO, $C_{O2}$, $C_{Ox}$), etc.), a pool/spa 240, and/or a sprinkler system 242 (e.g., fire, lawn and garden, etc.). The domestic household appliance 100 may be configured to communicate with any other domestic household appliances in a mesh network (e.g., 400) that consume energy, such as televisions, video game systems, computers, monitors, printers and scanners, sound and stereo systems, amplifiers, video systems, lighting systems, fans or ceiling fans, etc.

The domestic household appliance 100 also may be configured to react to energy usage by other household appliances that consume high amounts of energy, but that do not have a controller with similar peak energy reduction capabilities. For example, the controller 104 of the domestic household appliance 100 can control the operation of an energy consuming primary function unit 103 of the household appliance 100, such as the 'on' and 'off' times of duty cycles, based on data regarding one or more other household appliances. The controller 104 can react or respond (e.g., automatically react or respond) to the received data, for example, by adapting, changing, or suspending the operation of the primary function unit 103 of the household appliance, shifting priorities of the primary function unit 103 of the household appliance 100 or other household appliances in the network that have peak energy reduction capabilities, and/or by transmitting software applications, data and/or commands to other household appliances in the network (e.g., 400) with peak energy reduction capabilities or the Smart Grid.

The mesh network (e.g., 300, 400) of household appliances is not limited to high energy consuming appliances and may include low energy usage appliances (not shown). For example, in some instances, a single low energy usage appliance may contribute very little to the peak energy usage of the household. However, if a plurality of low energy usage appliances are turned on at the same time, the cumulative energy usage of these low energy usage appliances may impact the peak energy usage of the household. Other appliances also may be included in the mesh network (e.g., 300, 400), such as temporary use or portable appliances; for example, a hair dryer, hair straightener, hair curler or curling iron, power razor, power toothbrush, laundry iron, etc.

Referring to FIG. 7, a household appliance 100 also may be configured to communicate with one or more energy generating domestic appliances such as, for example, a solar panel 502, wind mill 504, water mill 506, hydrothermal device 508, etc. For example, in response to communications with one or more energy generating domestic appliances, a controller 104 of a household appliance 100 of the mesh network 300, 400 can react or respond (e.g., automatically react or respond) to the received data, for example, by adapting, changing, or suspending the operation of the primary function unit 103 of the household appliance 100, shifting priorities of the primary function unit 103 of the household appliance 100 or other household appliances in the network that have peak energy reduction capabilities, and/or by transmitting software applications, data and/or commands to other household appliances in the network (e.g., 400) with peak energy reduction capabilities or the Smart Grid.

In the exemplary embodiments, the mesh network 300, 400, 500 can include domestic household appliances of a single-family domestic household (e.g., single-family dwelling, home, apartment, condominium, townhouse, etc.). In other embodiments, the mesh network 300, 400, 500 can include domestic household appliances of a multi-family domestic household (e.g., residential multi-family dwelling, home, apartment, condominium, townhouse, etc.). For example, the mesh network 300, 400, 500 can include domestic household appliances 100 of a plurality of single family households (e.g., an organized group of households), for example, in a neighborhood or community, such as a private community, retirement community, etc, or a plurality of apartments, condominiums, or townhomes, etc. in an apartment, condominium, or townhome complex.

Figure 8:
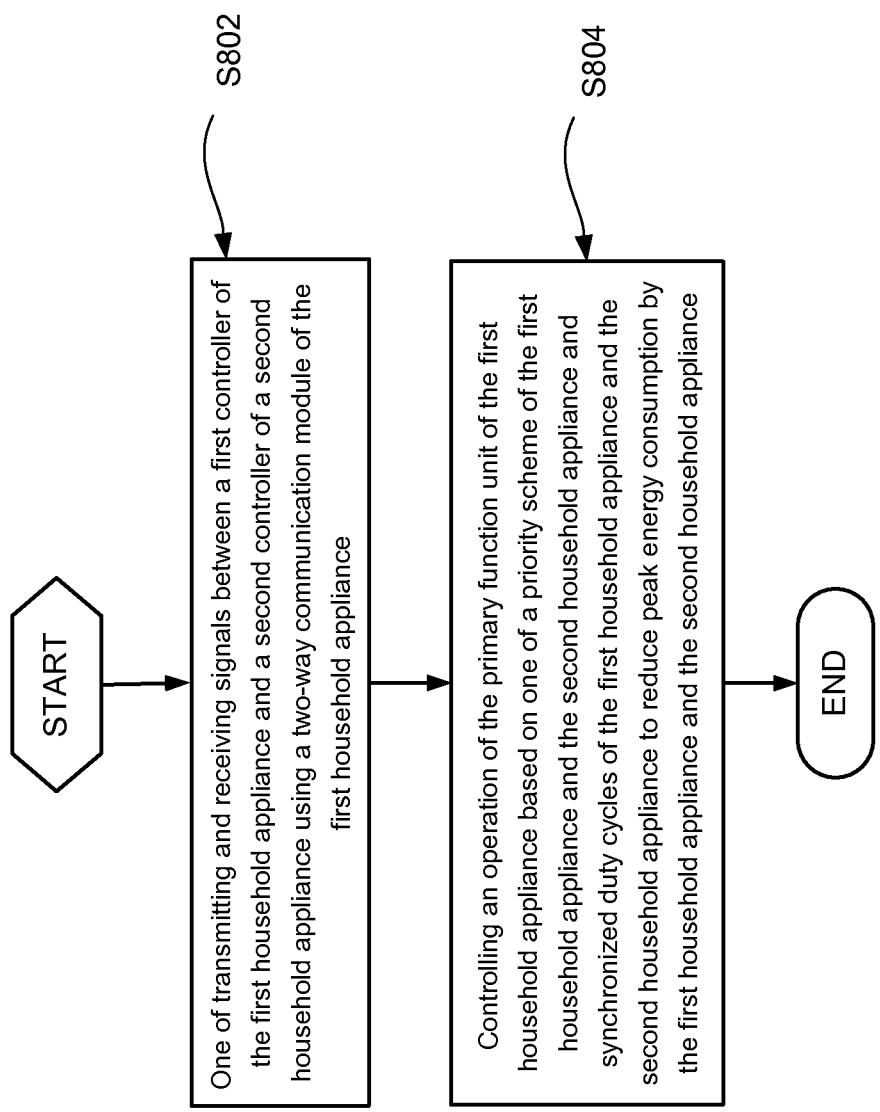
FIG. 8 is a flow chart showing a method according to an exemplary embodiment of the invention.

Referring to FIGS. 3 and 8, an exemplary method of controlling an operation of a primary function unit 103 that performs a primary function of a first household appliance 100A based on one of a priority scheme of the first household appliance 100A and a second household appliance 100B and synchronized duty cycles of the first household appliance 100A and the second household appliance 100B, wherein the first household appliance 100A is configured to communicate with the second household appliance 100B, will now be described.

In operation, the method includes a step S802 of transmitting and/or receiving signals between a first controller 104 of the first household appliance 100A and a second controller 104 of a second household appliance 100B using a two-way communication module 106 of the first household appliance 100A. The method further includes a step S804 of controlling an operation of the primary function unit 103 of the first household appliance 100A based on a priority scheme of the first household appliance 100A and the second household appliance 100B and synchronized duty cycles of the first household appliance 100A and the second household appliance 100B to reduce peak energy consumption by the first household appliance 100A and the second household appliance 100B. The method can include controlling the operation of the primary function unit 103 of the first household appliance 100A based on a user interaction with the first household appliance 100A or the second household appliance 100B.

The step S804 of controlling can include receiving and executing one of software applications, data, and commands from the second household appliance 100B; reacting or responding to the one of software applications, data, and commands from the second household appliance 100B; and transmitting one of software applications, data, and commands to the second household appliance 100B. The step S804 of controlling can include adapting, changing, or suspending the operation of the primary function unit 103 of the first household appliance 100A, or synchronizing duty cycles of the first household appliance 100A with the second household appliance 100B.

The method further can include a step of storing a priority scheme of the first household appliance 100A and the second household appliance 100B in a storage device 107, 108 of the first household appliance 100A, and/or inputting a user-configurable priority scheme into the storage device 107, 108 using a user input interface 110.

With reference again to FIGS. 1-8, an exemplary embodiment includes a household appliance (e.g., 10, 100, 100A, 100B) configured to communicate with a second household appliance (e.g., 10, 100, 100A, 100B). The household appliance (e.g., 10, 100, 100A, 100B) includes a housing (e.g., 2, 102) having primary function means (e.g., 3, 103) for performing a primary function of the household appliance (e.g., 10, 100, 100A, 100B), controller means (e.g., 4, 104) for controlling an operation of the primary function means (e.g., 3, 103) to reduce peak energy consumption by the first household appliance (e.g., 10, 100, 100A, 100B) and the second household appliance (e.g., 10, 100, 100A, 100B), and communication means (e.g., 6, 106) within the housing (e.g., 2, 102) for transmitting and receiving signals between the controller means (e.g., 4, 104) and the second household appliance (e.g., 10, 100, 100A, 100B).

The present invention has been described herein in terms of several exemplary embodiments. However, modifications and additions to these embodiments will become apparent to those of ordinary skill in the art upon a reading of the foregoing description.

What is claimed is:

1. A household appliance comprising:
   a primary function unit that performs a primary function of the household appliance;
   a controller that controls an operation of the primary function unit; and
   a two-way communication module that transmits and receives signals between the controller and a second household appliance,
   wherein the controller is programmed to control the operation of the primary function unit based on the signals transmitted and received by the two-way communication module and based on one of a priority scheme of the household appliance and the second household appliance and synchronized duty cycles of the household appliance and the second household appliance to reduce peak energy consumption by the first household appliance and the second household appliance.

2. The household appliance of claim 1, wherein the two-way communication module includes a wired communication module.

3. The household appliance of claim 1, wherein the two-way communication module includes a wireless communication module.

4. The household appliance of claim 3, wherein the wireless communication module includes a ZigBee module.

5. The household appliance of claim 1, wherein the controller includes a processor.

6. The household appliance of claim 1, wherein the controller is programmed to control the operation of the primary function unit based on the priority scheme of the household appliance and the second household appliance and based on the synchronized duty cycles of the household appliance and the second household appliance.

7. The household appliance of claim 1, wherein the controller is programmed to control the operation of the primary function unit based on the priority scheme of the household appliance and the second household appliance and based on a user interaction with the household appliance or the second household appliance.

8. The household appliance of claim 1, wherein the controller is programmed to control the operation of the primary function unit based on the synchronized duty cycles of the household appliance and the second household appliance and based on a user interaction with the household appliance or the second household appliance.

9. The household appliance of claim 7, wherein the controller is programmed to control the operation of the primary function unit based on the synchronized duty cycles of the household appliance and the second household appliance and based on the user interaction with the household appliance or the second household appliance.

10. The household appliance of claim 1, wherein the controller is programmed to one of:
   execute one of software applications, data, and commands received by the two-way communication module from the second household appliance;
   react or respond to the one of software applications, data, and commands received by the two-way communication module from the second household appliance; and
   transmit one of software applications, data, and commands to the second household appliance using the two-way communication module.

11. The household appliance of claim 10, wherein the controller reacts or responds by adapting, changing, or suspending the operation of the primary function unit.

12. The household appliance of claim 1, wherein the controller reacts or responds by controlling the primary function unit to synchronize the duty cycles of the first household appliance with the second household appliance.

13. The household appliance of claim 1, wherein the controller reacts or responds by controlling an ON and an OFF state of the primary function unit based on the priority scheme.

14. The household appliance of claim 1, further comprising:
   a storage device that stores the priority scheme of the household appliance.

15. The household appliance of claim 1, further comprising:
   a storage device that stores the priority scheme of the household appliance and the second household appliance.

16. The household appliance of claim 14, wherein the priority scheme is a factory-set priority scheme of the household appliance.

17. The household appliance of claim 1, further comprising:
   a user input interface for inputting user-configurable priority schemes.

18. The household appliance of claim 14, further comprising:
   a user input interface for inputting a user-configurable priority scheme into the storage device.

19. A method of controlling an operation of a primary function unit that performs a primary function of a first household appliance, the method comprising:
   one of transmitting and receiving signals between a first controller of the first household appliance and a second controller of a second household appliance using a two-way communication module of the first household appliance; and
   controlling an operation of the primary function unit of the first household appliance based on the signals transmitted or received using the two-way communication module of the first household appliance and based on one of a priority scheme of the first household appliance and the second household appliance and synchronized duty cycles of the first household appliance and the second household appliance to reduce peak energy consumption by the first household appliance and the second household appliance.

20. The method of claim 19, further comprising:
   controlling the operation of the primary function unit of the first household appliance based on a user interaction with the first household appliance or based on a user interaction with the second household appliance indicated by the signal received by the two-way communication module.

21. The method of claim 19, wherein the controlling includes:
   executing one of software applications, data, and commands received by the two-way communication module from the second household appliance;
   reacting or responding to the one of software applications, data, and commands received by the two-way communication module from the second household appliance; and
   transmitting one of software applications, data, and commands to the second household appliance using the two-way communication module.

22. The method of claim 19, wherein the controlling includes:
   adapting, changing, or suspending the operation of the primary function unit of the first household appliance.

23. The method of claim 19, wherein the controlling includes:
   synchronizing duty cycles of the first household appliance with the second household appliance.

24. The method of claim 19, further comprising:
   storing the priority scheme of the first household appliance and the second household appliance in a storage device of the first household appliance.

25. The method of claim 19, further comprising:
   inputting a user-configurable priority scheme into the storage device using a user input interface.

26. The household appliance of claim 1, wherein the signals transmitted and received by the two-way communication module include data with respect to the operation of the primary function unit of at least one of the first household appliance and the second household appliance, and
   wherein the controller is programmed to adapt, change, or suspend the operation of the primary function unit based on the data to reduce peak energy consumption by the first household appliance and the second household appliance.

27. The household appliance of claim 1, wherein the signals transmitted and received by the two-way communication module include data with respect to current or future operation of the primary function unit of at least one of the first household appliance and the second household appliance, and
   wherein the controller is programmed to adapt, change, or suspend the operation of the primary function unit based on the data to reduce peak energy consumption by the first household appliance and the second household appliance.

28. The method of claim 19, wherein the signals transmitted and received by the two-way communication module include data with respect to the operation of the primary function unit of at least one of the first household appliance and the second household appliance, and
   wherein the method further comprises adapting, changing, or suspending the operation of the primary function unit based on the data to reduce peak energy consumption by the first household appliance and the second household appliance.

29. The method of claim 19, wherein the signals transmitted and received by the two-way communication module include data with respect to current or future operation of the primary function unit of at least one of the first household appliance and the second household appliance, and wherein the method further comprises adapting, changing, or suspending the operation of the primary function unit based on the data to reduce peak energy consumption by the first household appliance and the second household appliance.

* * * * *